(12) United States Patent
Snyder

(10) Patent No.: US 7,789,215 B1
(45) Date of Patent: Sep. 7, 2010

(54) CENTRIFUGAL/VIBRATORY FEEDER SYSTEM

(76) Inventor: Michael Snyder, 13454 Chambord St., Brooksville, FL (US) 34613

( * ) Notice: Subject to any disclaimer, the term of this patent is extended or adjusted under 35 U.S.C. 154(b) by 119 days.

(21) Appl. No.: 12/317,364

(22) Filed: Dec. 22, 2008

(51) Int. Cl.
*B65G 47/14* (2006.01)
(52) U.S. Cl. .................................. 198/391; 198/757
(58) Field of Classification Search ............... 198/391, 198/392, 756, 757
See application file for complete search history.

(56) References Cited

U.S. PATENT DOCUMENTS

| | | | | |
|---|---|---|---|---|
| 4,699,261 A * | 10/1987 | Nesin | ........................ | 198/398 |
| 4,739,873 A * | 4/1988 | Yajima | ........................ | 198/391 |
| 4,804,093 A * | 2/1989 | Durow | ........................ | 209/691 |
| 5,608,962 A * | 3/1997 | Colligan et al. | ............... | 29/517 |
| 5,651,176 A | 7/1997 | Ma | | |
| 5,657,902 A | 8/1997 | Kraus | | |
| 5,713,454 A * | 2/1998 | Jordan | ........................ | 198/391 |
| 5,746,323 A | 5/1998 | Dragotta | | |
| 5,853,078 A * | 12/1998 | Kneubuhler | ................ | 198/391 |
| 6,257,392 B1 * | 7/2001 | Graham | ....................... | 198/396 |
| 6,360,870 B1 * | 3/2002 | Wooldridge | ................ | 198/391 |
| 6,450,320 B1 * | 9/2002 | Turek | ......................... | 198/380 |
| 7,036,652 B2 * | 5/2006 | Hayata et al. | ............... | 198/391 |
| 2004/0238330 A1 * | 12/2004 | Shendge | ..................... | 198/757 |

FOREIGN PATENT DOCUMENTS

| | | | |
|---|---|---|---|
| JP | 62157117 A | * | 7/1987 |
| JP | 63208423 A | * | 8/1988 |
| JP | 63277121 A | * | 11/1988 |

* cited by examiner

*Primary Examiner*—Mark A Deuble

(57) ABSTRACT

Primary and secondary housings each have a cylindrical side wall and a horizontal circular lower plate. A centrifugal assembly is formed by the secondary housing. A first motor rotates the circular plate of the secondary housing. Cleats extend upwardly from the circular plate whereby when a quantity of workpieces is placed in the secondary housing the workpieces will be projected out of the secondary housing into the primary housing by centrifugal force caused by the spinning cleats. A vibratory assembly is formed by the primary housing. A second motor reciprocates and vibrates the primary housing. A ramp is secured interiorly of the side wall of the primary housing and extends in a spiral configuration from the circular plate to the top of the side wall.

5 Claims, 4 Drawing Sheets

CENTRIFUGAL/VIBRATORY FEEDER SYSTEM

BACKGROUND OF THE INVENTION

1. Field of the Invention

The present invention relates to a centrifugal/vibratory feeder system and more particularly pertains to separating generally cylindrical workpieces and axially orienting the separated workpieces while individually feeding them for further processing.

2. Description of the Prior Art

The use of feeder systems of known designs and configurations is known in the prior art. More specifically, feeder systems of known designs and configurations previously devised and utilized for the purpose of feeding and separating workpieces are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,657,902 issued Aug. 19, 1997 to Kraus relates to a Vibratory Feeder for Granular Material. U.S. Pat. No. 5,651,176 issued Jul. 29, 1997 to Ma relates to Vibratory Feeder Trays and Synchronous Mass Production Apparatus for Circuit Board Fabrication. Lastly, U.S. Pat. No. 5,746,323 issued May 5, 1998 to Dragotta relates to an Apparatus for High Speed Inspection of Objects.

While these devices fulfill their respective, particular objectives and requirements, the aforementioned patents do not describe a centrifugal/vibratory feeder system that allows for separating generally cylindrical workpieces and axially orienting the separated workpieces while individually feeding them for further processing.

In this respect, the centrifugal/vibratory feeder system according to the present invention substantially departs from the conventional concepts and designs of the prior art, and in doing so provides an apparatus primarily developed for the purpose of separating generally cylindrical workpieces and axially orienting the separated workpieces while individually feeding them for further processing.

Therefore, it can be appreciated that there exists a continuing need for a new and improved centrifugal/vibratory feeder system which can be used for separating generally cylindrical workpieces and axially orienting the separated workpieces while individually feeding them for further processing. In this regard, the present invention substantially fulfills this need.

SUMMARY OF THE INVENTION

In view of the foregoing disadvantages inherent in the known types of feeder systems of known designs and configurations now present in the prior art, the present invention provides an improved centrifugal/vibratory feeder system. As such, the general purpose of the present invention, which will be described subsequently in greater detail, is to provide a new and improved centrifugal/vibratory feeder system and method which has all the advantages of the prior art and none of the disadvantages.

To attain this, the present invention essentially comprises a centrifugal/vibratory feeder system. First provided is a primary housing. The primary housing has a cylindrical side wall with a diameter and an axial height. The side wall has an interior surface and an exterior surface. The primary housing has a bottom with a horizontal circular lower plate and an open top with a vertical axis of rotation.

Next provided is a secondary housing. The secondary housing has a cylindrical side wall with a diameter and an axial height. The side wall has an interior surface and an exterior surface. The secondary housing has a horizontal circular lower plate and an open top with a vertical axis coincident with the axis of the primary housing. The height of the side wall of the secondary housing is between 50 percent and 75 percent of the height of the side wall of the primary housing. The diameter of the lower plate of the secondary housing is between 50 percent and 75 percent of the diameter of the lower plate of the primary housing.

Next provided is a centrifugal assembly. The centrifugal assembly is formed radially by the side wall of the secondary housing and is secured to the circular plate of the primary housing. The centrifugal assembly is formed axially by the circular plate of the secondary housing being rotatable above the circular plate of the primary housing. The circular plate of the secondary housing has an upper surface and a lower surface. A first motor is operatively coupled to the lower surface for rotating the circular plate of the secondary housing. Five radially oriented linear cleats extend upwardly from the upper surface. The cleats have an elastomeric coating. In this manner, when a quantity of workpieces is placed in the secondary housing, the workpieces will be separated and projected out of the secondary housing into the primary housing by centrifugal force caused by the spinning cleats.

Next provided is a vibratory assembly. The vibratory assembly is formed radially by the side wall of the primary housing and axially by the circular plate of the primary housing. The circular plate of the primary housing has an upper surface and a lower surface. A plurality of leaf springs couples the circular plate of the primary housing to a fixed recipient surface. An electromagnetic motor is fixedly secured with respect to each leaf spring to reciprocate and vibrate the primary housing and the workpieces on the circular plate of the primary housing to advance the workpieces up the ramp.

A ramp is provided. The ramp is secured to the interior surface of the side wall of the primary housing and extends outwardly therefrom. The ramp extends in a spiral configuration from the circular plate of the primary housing to the top of the side wall. The ramp has an enlarged width along a majority of its length sufficient to support and feed a plurality of the workpieces which are laterally spaced. The ramp has a reduced width along a minority of its length adjacent to the top of the side wall sufficient to support and feed a single row of the workpieces but insufficient to support and feed a plurality of the workpieces which are laterally spaced. The ramp is adapted to be reciprocated and vibrated by the electromagnetic motor. A slide has an upper end at the ramp adjacent to the reduced width of the ramp and a lower end above the secondary housing to return the workpieces which are unaligned back for re-feeding up the ramp.

The ramp has a terminal end at the top of the side wall with an accelerator tube to sequentially receive the aligned workpieces. The accelerator tube has a radial aperture with a supply of pressurized air to accelerate the movement of the workpieces through the tube and beyond for further processing.

An optical sensor is provided in the side wall of the primary housing at an elevation slightly above the side wall of the secondary housing. The optical sensor is adapted to detect an absence of the workpieces moving from the secondary housing.

Lastly provided is a lamp. The lamp is adapted to be illuminated as a signal to an operator for adding more of the workpieces to the secondary housing in response to a detected absence of the workpieces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
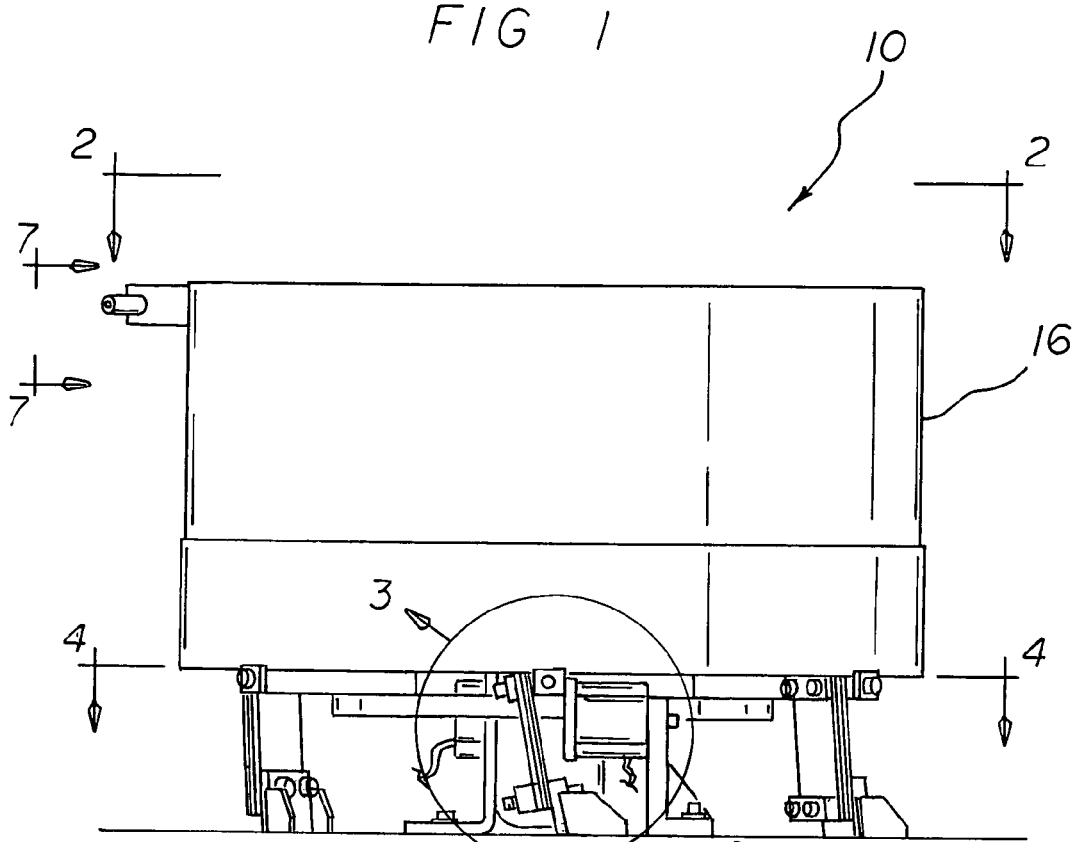
FIG. 1 is a front elevational view of a centrifugal/vibratory feeder system constructed in accordance with the principles of the present invention.
Figure 2:
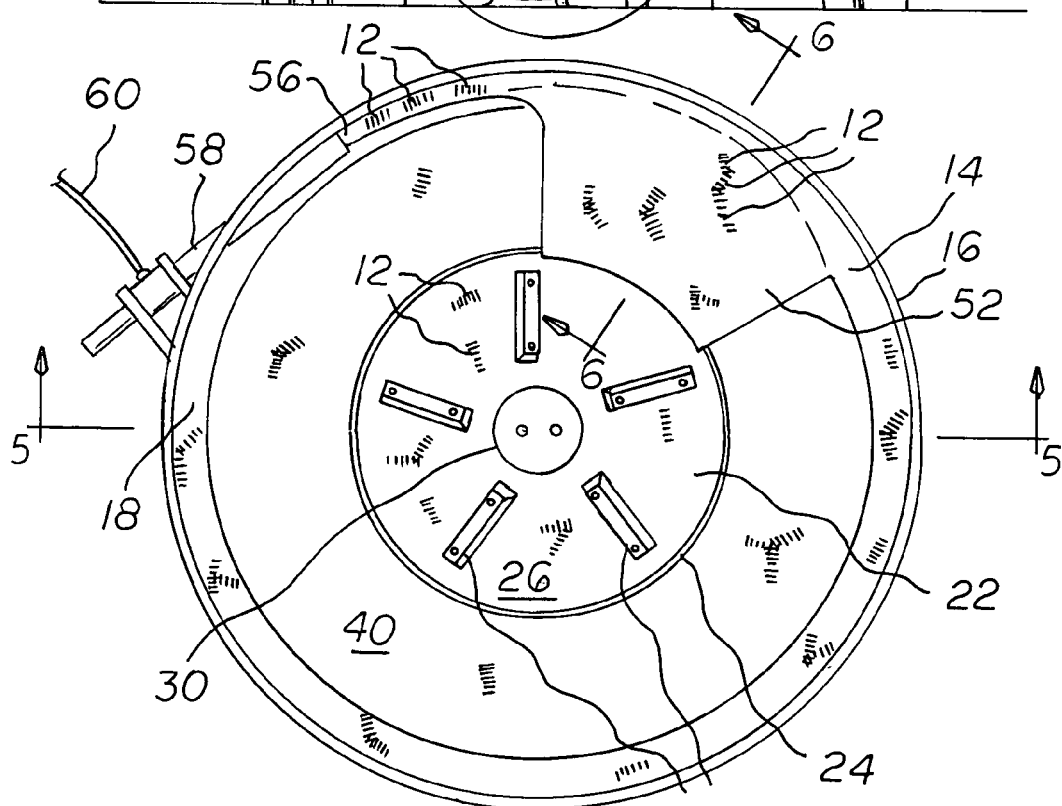
FIG. 2 is a plan view of the centrifugal/vibratory feeder system taken along line 2-2 of FIG. 1.
Figure 3:
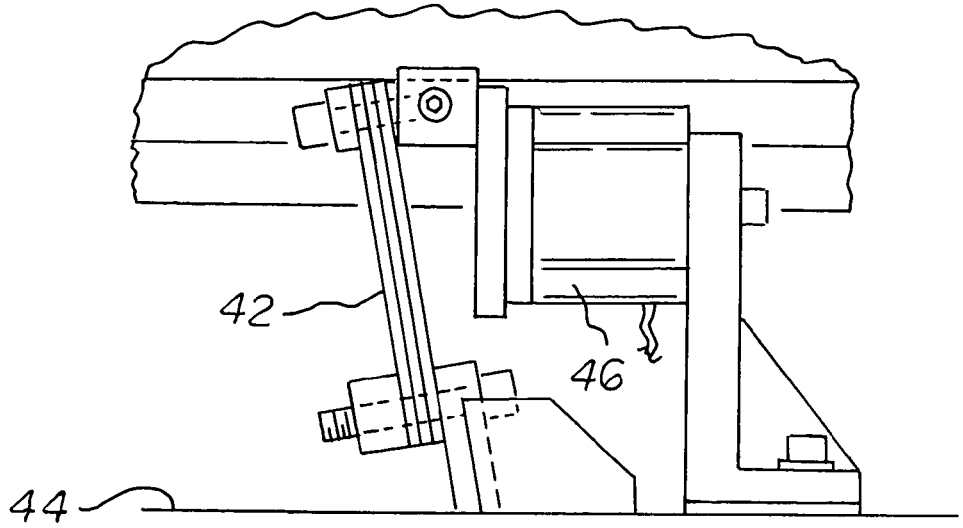
FIG. 3 is an enlarged front elevational view taken at Circle 3 of FIG. 1.
Figure 4:
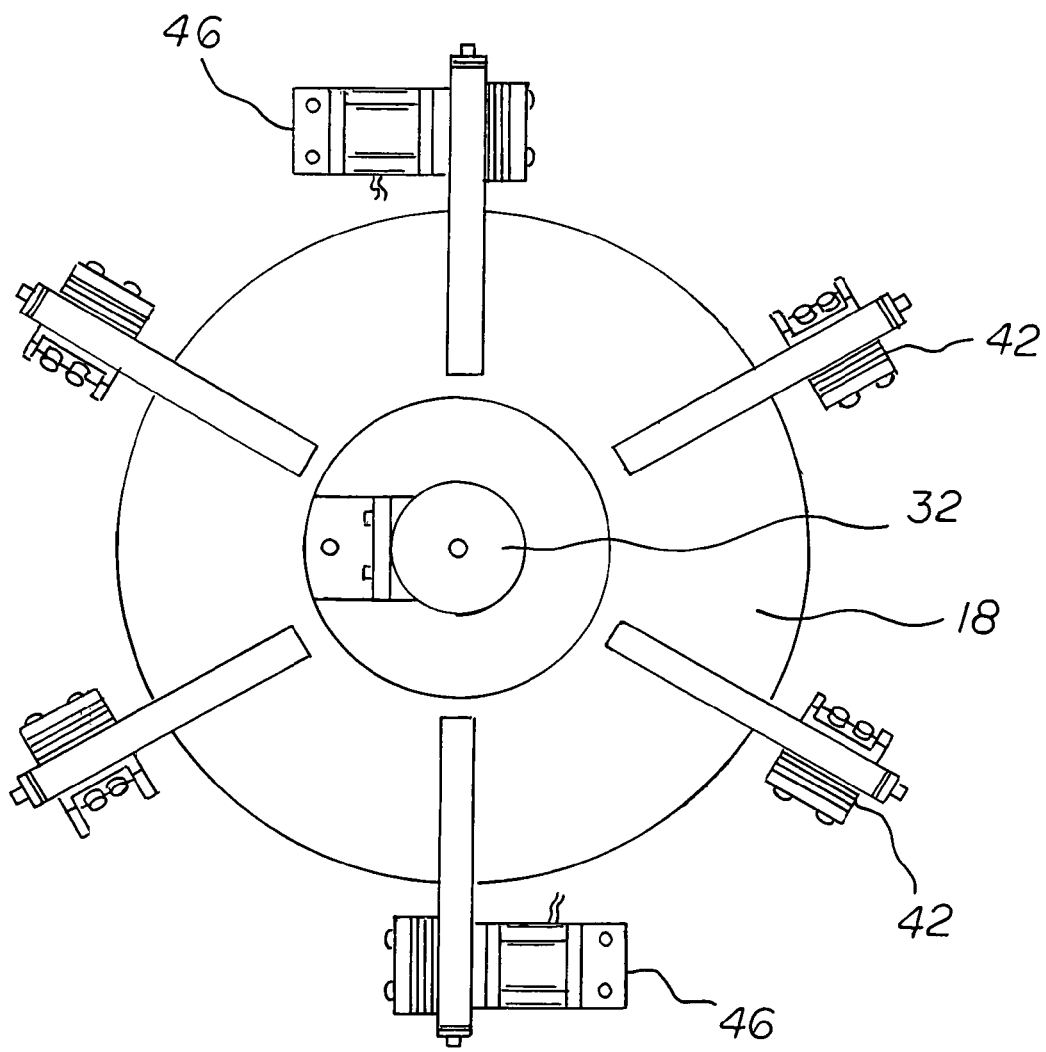
FIG. 4 is a cross sectional view taken along line 4-4 of FIG. 1.
Figure 5:
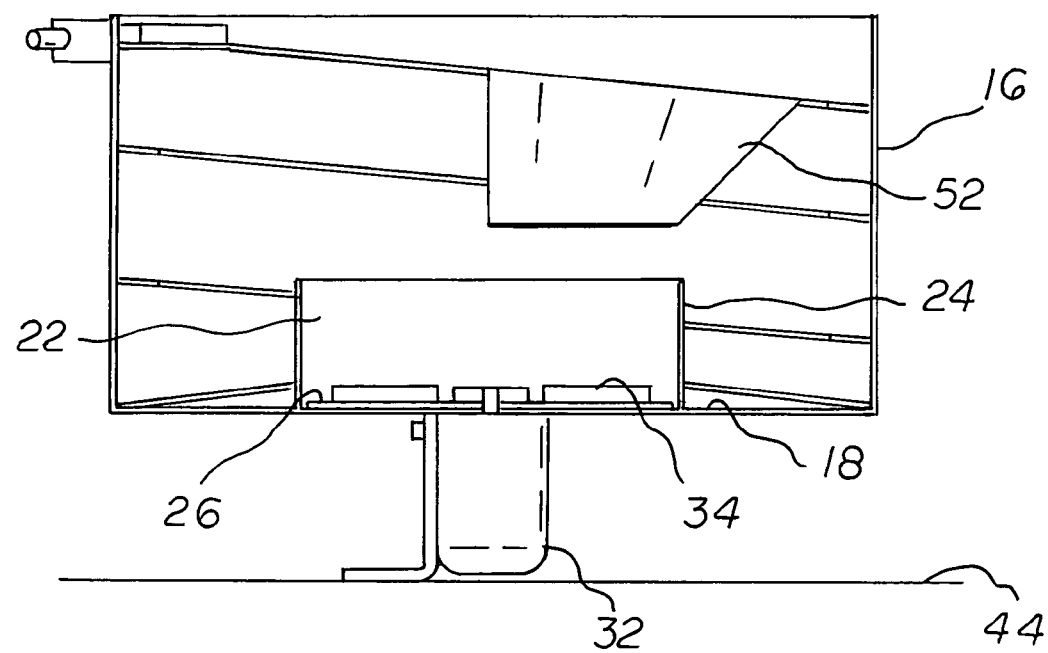
FIG. 5 is a cross sectional view taken along line 5-5 of FIG. 2.
Figure 6:
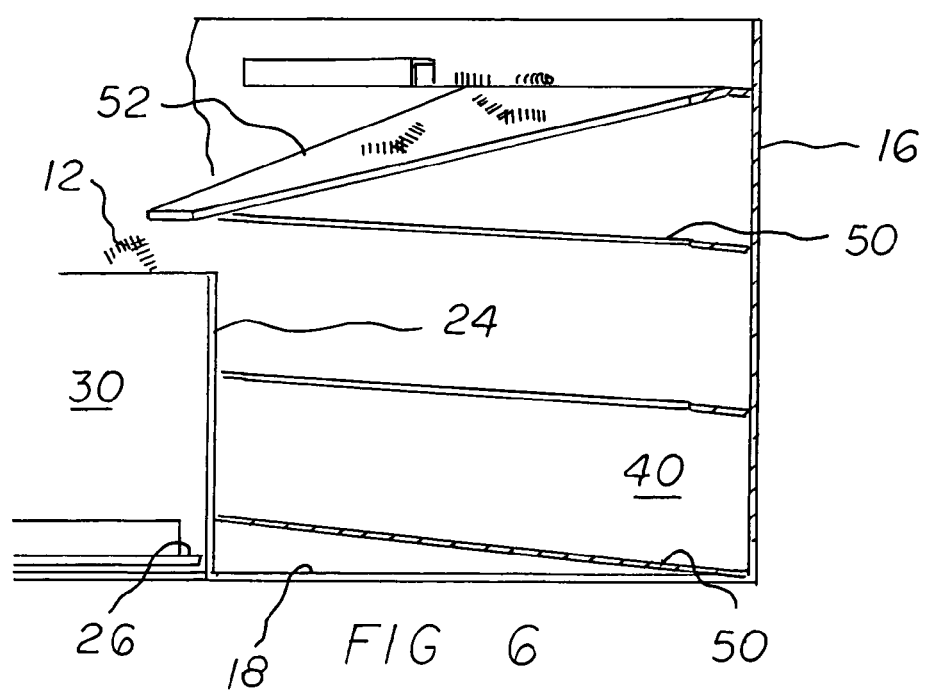
FIG. 6 is a cross sectional view taken along line 6-6 of FIG. 2.
Figure 7:
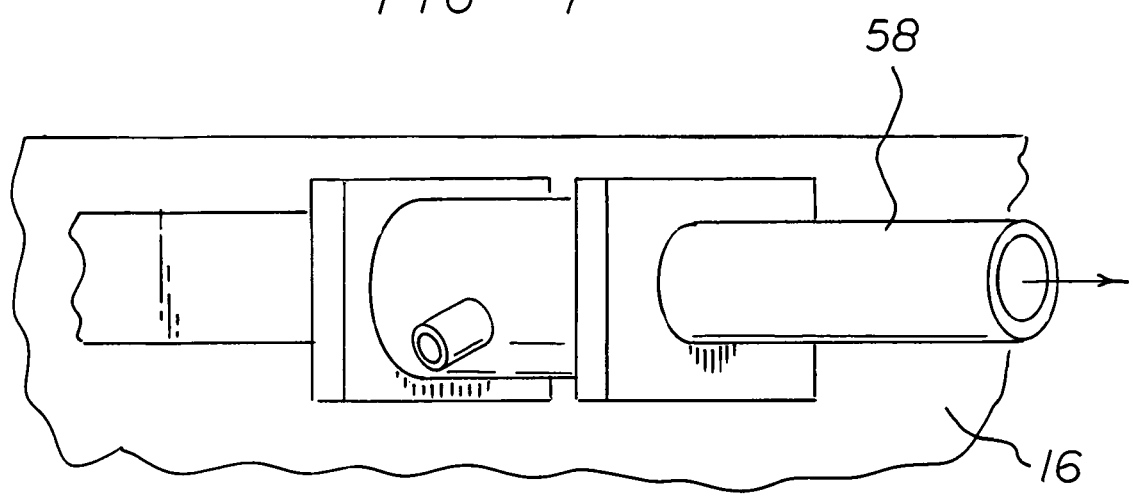
FIG. 7 is a side elevational view of the system taken along line 7-7 of FIG. 1.
Figure 8:
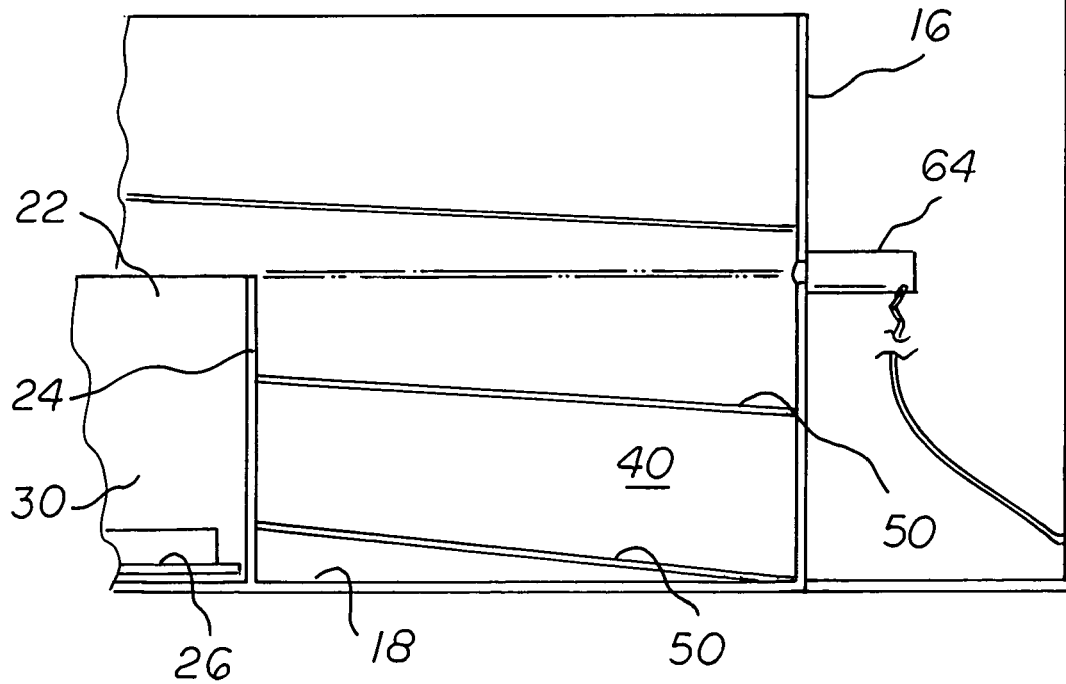
FIG. 8 is a cross sectional view taken along line 8-8 of FIG. 2.

With reference now to the drawings, and in particular to FIG. 1 thereof, the preferred embodiment of the new and improved centrifugal/vibratory feeder system, referred to as a CentriVibe, embodying the principles and concepts of the present invention and generally designated by the reference numeral 10 will be described.

The present invention, the centrifugal/vibratory feeder system 10 is comprised of a plurality of components. Such components in their broadest context include primary and secondary housings forming centrifugal and vibratory assemblies and with a ramp between the housings. Such components are individually configured and correlated with respect to each other so as to attain the desired objective.

The system is for separating generally cylindrical workpieces 12 and for axially orienting the separated workpieces while individually feeding them for further processing. The workpieces are coil springs in the preferred embodiment. The separating and orienting and feeding are done in a safe, rapid, reliable and economical manner.

First provided is a primary housing 14. The primary housing has a cylindrical side wall 16 with a diameter and an axial height. The side wall has an interior surface and an exterior surface. The primary housing has a bottom with a horizontal circular lower plate 18 and an open top with a vertical axis of rotation.

Next provided is a secondary housing 22. The secondary housing has a cylindrical side wall 24 with a diameter and an axial height. The side wall has an interior surface and an exterior surface. The secondary housing has a horizontal circular lower plate 26 and an open top with a vertical axis coincident with the axis of the primary housing. The height of the side wall of the secondary housing is between 50 percent and 75 percent of the height of the side wall of the primary housing. The diameter of the lower plate of the secondary housing is between 50 percent and 75 percent of the diameter of the lower plate of the primary housing.

Next provided is a centrifugal assembly 30. The centrifugal assembly is formed radially by the side wall of the secondary housing and is secured to the circular plate of the primary housing. The centrifugal assembly is formed axially by the circular plate of the secondary housing being rotatable above the circular plate of the primary housing. The circular plate of the secondary housing has an upper surface and a lower surface. A first motor 32 is operatively coupled to the lower surface for rotating the circular plate of the secondary housing. Five radially oriented linear cleats 34 extend upwardly from the upper surface. The cleats have an elastomeric coating. In this manner, when a quantity of workpieces 12 is placed in the secondary housing, the workpieces will be separated and projected out of the secondary housing into the primary housing by centrifugal force caused by the spinning cleats.

Next provided is a vibratory assembly 40. The vibratory assembly is formed radially by the side wall of the primary housing and axially by the circular plate of the primary housing. The circular plate of the primary housing has an upper surface and a lower surface. A plurality of leaf springs 42 couples the circular plate of the primary housing to a fixed recipient surface 44. An electromagnetic motor 46 is fixedly secured with respect to each leaf spring to reciprocate and vibrate the primary housing and the workpieces on the circular plate of the primary housing to advance the workpieces up the ramp.

A ramp 50 is provided. The ramp is secured to the interior surface of the side wall of the primary housing and extends outwardly therefrom. The ramp extends in a spiral configuration from the circular plate of the primary housing to the top of the side wall. The ramp has an enlarged width along a majority of its length sufficient to support and feed a plurality of the workpieces 12 which are laterally spaced. The ramp has a reduced width along a minority of its length adjacent to the top of the side wall sufficient to support and feed a single row of the workpieces but insufficient to support and feed a plurality of the workpieces which are laterally spaced. The ramp is adapted to be reciprocated and vibrated by the electromagnetic motor. A slide 52 has an upper end at the ramp adjacent to the reduced width of the ramp and a lower end above the secondary housing to return the workpieces which are unaligned back for re-feeding up the ramp.

The ramp has a terminal end 56 at the top of the side wall with an accelerator tube 58 to sequentially receive the aligned workpieces. The accelerator tube has a radial aperture with a supply 60 of pressurized air to accelerate the movement of the workpieces through the tube and beyond for further processing.

An optical sensor 64 is provided in the side wall of the primary housing at an elevation slightly above the side wall of the secondary housing. The optical sensor is adapted to detect an absence of the workpieces moving from the secondary housing.

Lastly provided is a lamp 66. The lamp is adapted to be illuminated as a signal to an operator for adding more of the workpieces to the secondary housing in response to a detected absence of the workpieces.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A centrifugal/vibratory feeder system comprising:
   primary and secondary housings, each having a cylindrical side wall and a horizontal circular lower plate;
   a centrifugal assembly formed by the secondary housing with a first motor for rotating the circular plate of the secondary housing, cleats extending upwardly from the circular plate whereby when a quantity of workpieces is placed in the secondary housing they will be projected out of the secondary housing into the primary housing by centrifugal force caused by the spinning cleats;
   a vibratory assembly formed by the primary housing with a second motor to reciprocate and vibrate the primary housing; and
   a ramp secured interiorly of the side wall of the primary housing and extending in a spiral configuration from the circular plate to the top of the side wall.

2. The system as set forth in claim 1 and further including:
   an enlarged width along a majority of the length of the ramp and a reduced width along a minority of the ramp adjacent to the top of the side wall sufficient to support and feed a single row of workpieces but insufficient to support and feed a plurality of the workpieces that are laterally spaced, the ramp adapted to be reciprocated and vibrated by the second motor, a slide having an upper end at the ramp adjacent to the reduced width of the ramp and a lower end above the secondary housing to return the workpieces that are unaligned not on the ramp back for re-feeding up the ramp.

3. The system as set forth in claim 2 wherein the ramp has a terminal end at the upper end of the side wall with an accelerator tube to sequentially receive the aligned workpieces, the accelerator tube having a radial aperture with a supply of pressurized air to accelerate the movement of the aligned workpieces through the tube and beyond for further processing.

4. The system as set forth in claim 1 and further including:
   an optical sensor in the side wall of the primary housing at an elevation slightly above the side wall of the secondary housing, whereby the optical sensor is adapted to detect an absence of the workpieces moving from the secondary housing; and
   a lamp adapted to be illuminated as a signal to an operator for adding more workpieces to the secondary housing in response to a detected absence of the workpieces.

5. A centrifugal/vibratory feeder system for separating generally cylindrical workpieces and for axially orienting the workpieces that have been separated while individually feeding the separated workpieces for further processing comprising, in combination:
   a primary housing having a cylindrical side wall with a diameter and an axial height, the side wall having an interior surface and an exterior surface, the primary housing having a bottom with a horizontal circular lower plate, the primary housing having an open top with a vertical axis of rotation;
   a secondary housing having a cylindrical side wall with a diameter and an axial height, the side wall having an interior surface and an exterior surface, the secondary housing having a horizontal circular lower plate and an open top, with a vertical axis coincident with the axis of the primary housing, the height of the side wall of the secondary housing being between 50 percent and 75 percent of the height of the side wall of the primary housing, the diameter of the lower plate of the secondary housing being between 50 percent and 75 percent of the diameter of the lower plate of the primary housing;
   a centrifugal assembly formed radially by the side wall of the secondary housing secured to the circular plate of the primary housing, the centrifugal assembly formed axially by the circular plate of the secondary housing being rotatable above the circular plate of the primary housing, the circular plate of the secondary housing having an upper surface and a lower surface, a first motor operatively coupled to the lower surface for rotating the circular plate of the secondary housing, five radially oriented linear cleats extending upwardly from the upper surface, the cleats having an elastomeric coating, whereby when a quantity of workpieces is placed in the secondary housing the workpieces will be separated and projected out of the secondary housing into the primary housing by centrifugal force caused by the spinning cleats;
   a vibratory assembly formed radially by the side wall of the primary housing and axially by the circular plate of the primary housing, the circular plate of the primary housing having an upper surface and a lower surface, a plurality of leaf springs coupling the circular plate of the primary housing to a fixed recipient surface, an electromagnetic motor fixedly secured with respect to each leaf spring to reciprocate and vibrate the primary housing and the workpieces on the circular plate of the primary housing to advance the workpieces up the ramp;
   a ramp secured to the interior surface of the side wall of the primary housing and extending outwardly therefrom, the ramp extending in a spiral configuration from the circular plate of the primary housing to the top of the side wall, the ramp having an enlarged width along a majority of its length sufficient to support and feed a plurality of the workpieces which are laterally spaced, the ramp having a reduced width along a minority of its length adjacent to the top of the side wall sufficient to support and feed a single row of the workpieces but insufficient to support and feed a plurality of workpieces that are laterally spaced workpieces, the ramp adapted to be reciprocated and vibrated by the electromagnetic motor, a slide having an upper end at the ramp adjacent to the reduced width of the ramp and a lower end above the secondary housing to return workpieces which are not aligned back for re-feeding up the ramp;
   the ramp having a terminal end at the top of the side wall with an accelerator tube to sequentially receive the aligned workpieces, the accelerator tube having a radial aperture with a supply of pressurized air to accelerate the movement of the workpieces through the tube and beyond for further processing;

an optical sensor in the side wall of the primary housing at an elevation slightly above the side wall of the secondary housing adapted to detect an absence of workpieces moving from the secondary housing; and a lamp adapted to be illuminated as a signal to an operator for adding more of the workpieces to the secondary housing in response to a detected absence of workpieces.

* * * * *